(12) United States Patent
Kirkwood et al.

(10) Patent No.: US 8,113,981 B2
(45) Date of Patent: Feb. 14, 2012

(54) MULTI-SPEED EPICYCLIC POWERSHIFT TRANSMISSION

(75) Inventors: Malcolm E. Kirkwood, Livonia, MI (US); Dumitru Puiu, Sterling Heights, MI (US)

(73) Assignee: MAGNA Powertrain USA, Inc., Troy, MI (US)

( * ) Notice: Subject to any disclaimer, the term of this patent is extended or adjusted under 35 U.S.C. 154(b) by 602 days.

(21) Appl. No.: 12/262,476

(22) Filed: Oct. 31, 2008

(65) Prior Publication Data

US 2009/0118060 A1    May 7, 2009

Related U.S. Application Data

(60) Provisional application No. 60/984,829, filed on Nov. 2, 2007.

(51) Int. Cl.
*F16H 3/62* (2006.01)
*F16H 3/44* (2006.01)
*F16H 37/06* (2006.01)
*F16D 23/00* (2006.01)

(52) U.S. Cl. ........ 475/275; 475/297; 475/330; 475/293; 192/36; 192/93 A; 192/70.23

(58) Field of Classification Search .......... None
See application file for complete search history.

(56) References Cited

U.S. PATENT DOCUMENTS

| | | | | |
|---|---|---|---|---|
| 2,095,140 A * | 10/1937 | Leeson | | 192/36 |
| 2,662,624 A * | 12/1953 | Giffen | | 192/17 R |
| 5,106,348 A * | 4/1992 | Koivunen | | 475/126 |
| 5,732,594 A * | 3/1998 | Janson et al. | | 74/333 |
| 5,971,883 A * | 10/1999 | Klemen | | 475/296 |
| 6,371,882 B1 * | 4/2002 | Casey et al. | | 477/5 |
| 6,702,709 B2 * | 3/2004 | Bowen | | 475/277 |
| 6,716,126 B2 * | 4/2004 | Bowen | | 475/5 |
| 7,093,517 B2 * | 8/2006 | Hanyu et al. | | 74/661 |
| 7,226,385 B2 * | 6/2007 | Tabata et al. | | 477/5 |
| 7,635,055 B2 * | 12/2009 | Ekonen et al. | | 192/20 |
| 7,806,798 B2 * | 10/2010 | Fukui et al. | | 475/297 |
| 2003/0199353 A1 * | 10/2003 | Bowen | | 475/5 |
| 2007/0225097 A1 * | 9/2007 | Raghavan et al. | | 475/5 |
| 2008/0234091 A1 * | 9/2008 | Ronk et al. | | 475/210 |
| 2010/0261570 A1 * | 10/2010 | Hino | | 475/318 |

* cited by examiner

*Primary Examiner* — David D Le
*Assistant Examiner* — Lillian Nguyen
(74) *Attorney, Agent, or Firm* — Harness, Dickey & Pierce, P.L.C.

(57) ABSTRACT

A multi-speed transmission includes a first power transmission module driven by an input shaft. A second power transmission module is driven by the first power transmission module. A third power transmission module is driven by the second power transmission module and drives an output shaft. Each power transmission module includes an actuation mechanism and a planetary gearset. Each actuation mechanism controls the output of its respective planetary gearset to one of a first gear ratio and a second gear ratio. One of the actuation mechanisms includes a clutch and a spring biasing a member to rotate and cause a corresponding actuation of the clutch. The clutch causes two members of the respective planetary gearset to rotate at substantially the same speed and provide the first gear ratio. The actuation mechanism selectively restricts the member from rotating and prevent actuation of the clutch to provide the second gear ratio.

24 Claims, 6 Drawing Sheets

Gear Ratio, Ratio Step and Shift Chart
7 SPEED

| | GEAR RATIO | RATIO STEP | POWER TRANSMISSION MODULE | | | SYNCHRO |
|---|---|---|---|---|---|---|
| | | | PT1 | PT2 | PT3 | |
| 1st | 4.51 | | | X | X | L |
| 2nd | 2.8 | 1.61 | | X | | R |
| 3rd | 2.1 | 1.33 | X | X | | R |
| 4th | 1.6 | 1.31 | | | X | R |
| 5th | 1.2 | 1.33 | X | | X | R |
| 6th | 1 | 1.20 | | | | R |
| 7th | 0.75 | 1.33 | X | | | R |
| NOTES | X Denotes Power Transmission Module is in Active Mode<br>R Synchronizer Engages to Right<br>L Synchronizer Engaged to Left | | | | | |

Gear Ratio, Ratio Step and Shift Chart
10 SPEED

| | | | POWER TRANSMISSION MODULE | | | | |
|---|---|---|---|---|---|---|---|
| | GEAR RATIO | RATIO STEP | PT1 0.75:1 | PT2 2.64:1 | PT3 1.16:1 | PT4 1.51:1 | SYNCHRO |
| 1st | 6.38 | | | X | X | X | L |
| 2nd | 4.78 | 1.33 | X | X | X | X | R |
| 3rd | 4.25 | 1.12 | | X | X | | R |
| 4th | 3.19 | 1.33 | X | X | X | | R |
| 5th | 2.64 | 1.21 | | | X | | R |
| 6th | 1.98 | 1.33 | X | | X | | R |
| 7th | 1.5 | 1.32 | | | | X | R |
| 8th | 1.125 | 1.33 | X | | | X | R |
| 9th | 1 | 1.13 | | | | | R |
| 10th | 0.75 | 1.33 | X | | | | R |
| NOTES | X Denotes Power Transmission Module is in Active Mode<br>R Synchronizer Engages to Right<br>L Synchronizer Engaged to Left | | | | | | |

MULTI-SPEED EPICYCLIC POWERSHIFT TRANSMISSION

This application claims the benefits of U.S. Provisional Application No. 60/984,829, filed Nov. 2, 2007.

FIELD

The present disclosure generally relates to automatic transmissions for vehicles. More particularly, multi-speed power shift transmissions having multiple epicyclic units are disclosed.

BACKGROUND

Many vehicles have been equipped with a power train including an engine and a multi-speed transmission. The multi-speed transmission allows torque to be transferred from the engine through a wide range of vehicle speeds. The engine operates through its torque range a number of times corresponding to the number of forward speed ratios that are available in the transmission.

A variety of manufacturers have provided three speed and four speed automatic transmissions. Other transmissions have been constructed or described in publications suggesting six, seven or eight speed automatic transmissions. The increased number of speed ratios reduces the step size between ratios and therefore improves the shift quality of the transmission by making the ratio changes substantially imperceptible to the operator under normal vehicle acceleration. However, previously known transmissions providing six or more forward speed gear ratios are relatively complex, heavy and difficult to package because of their relatively large size. Furthermore, these transmissions are relatively expensive to construct due to the complex machining of multiple fluid passageways required to actuate multiple hydraulically operated brakes and clutches found within the automatic transmissions.

SUMMARY

A multi-speed transmission includes an input shaft, an output shaft, and a first power transmission module driven by the input shaft. A second power transmission module is driven by the first power transmission module. A third power transmission module is driven by the second power transmission module and drives the output shaft. Each power transmission module includes an actuation mechanism and a planetary gearset. Each actuation mechanism is operable to control the output of its respective planetary gearset to one of a first gear ratio and a second gear ratio. One of the actuation mechanisms includes a clutch and a spring biasing a member to rotate and cause a corresponding actuation of the clutch. The clutch causes two members of the respective planetary gearset to rotate at substantially the same speed and provide the first gear ratio. The actuation mechanism is operable to selectively restrict the member from rotating and prevent actuation of the clutch to provide the second gear ratio.

In another form, a multi-speed transmission includes an input shaft, an output shaft and a first power transmission module driven by the input shaft. A second power transmission module is driven by the first power transmission module and drives the output shaft. Each power transmission module includes an actuation mechanism and a planetary gearset. Each actuation mechanism is operable to control the output of its respective planetary gearset to one of a first gear ratio and a different second gear ratio. One of the actuation mechanisms includes a ball ramp mechanism biased to actuate a clutch without external input. The clutch causes two members of the respective planetary gearset to rotate at substantially the same speed to provide the first gear ratio. The actuation mechanism is operable to restrict the ball ramp mechanism and prevent actuation of the clutch to provide the second gear ratio.

In another form, a multi-speed transmission includes an input shaft, an output shaft and a first planetary gearset outputting one of a gear ratio equal to 1 or a gear ratio less than 1 and being driven by the input shaft. A second planetary gearset outputs one of a gear ratio equal to 1 or a gear ratio greater than 1 and is driven by the first planetary gearset. A third planetary gearset outputs a gear ratio equal to 1 or a gear ratio greater than 1, is driven by the second planetary gearset and drive the output shaft. A biasing mechanism causes the second planetary gearset to output the gear ratio equal to 1. A brake counteracting the biasing mechanism causes the second planetary gearset to output the gear ratio greater than 1.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
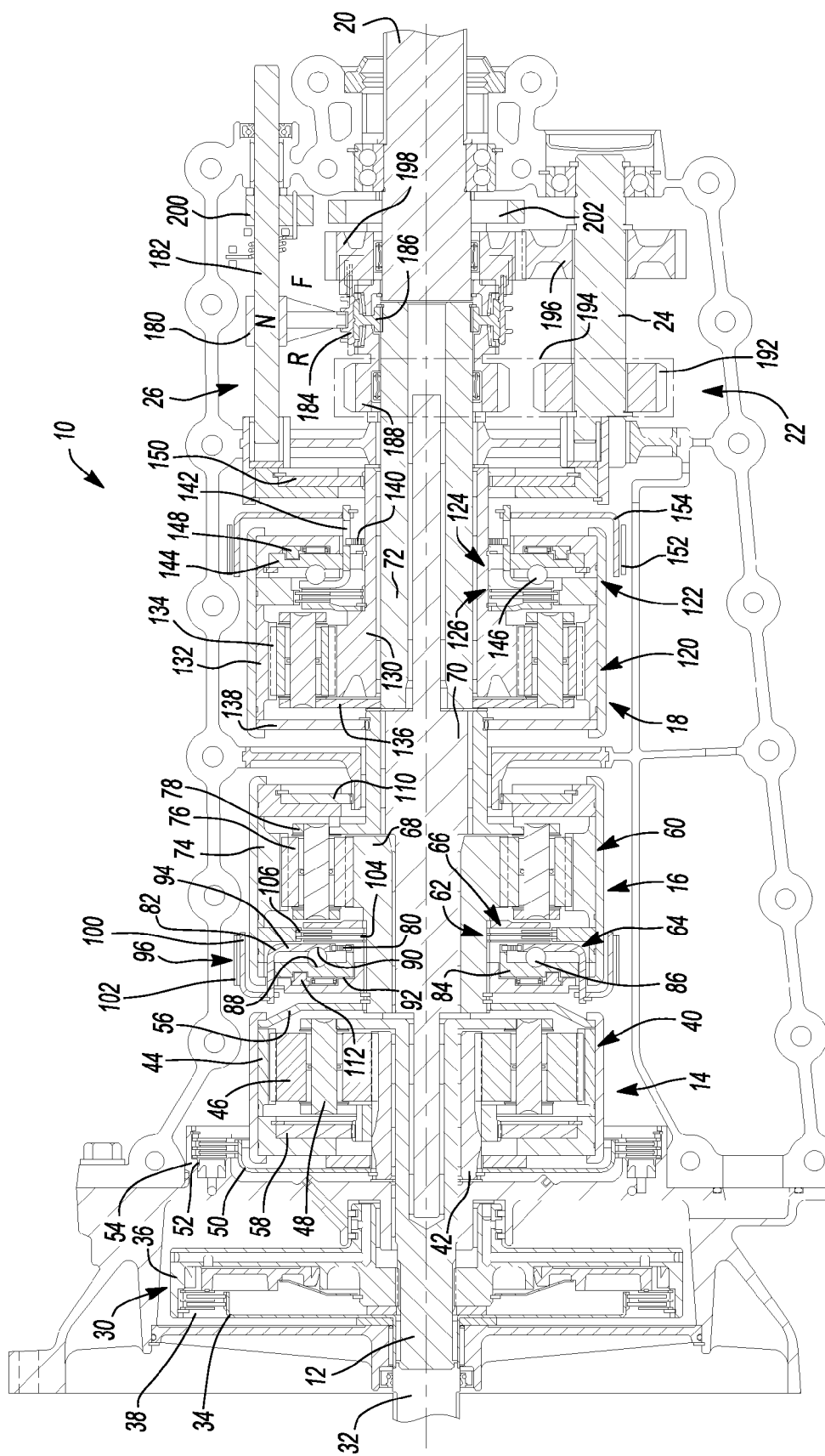
FIG. 1 is a cross-sectional view of a seven speed automatic transmission.

The following description is merely exemplary in nature and is not intended to limit the present disclosure, application, or uses. It should be understood that throughout the drawings, corresponding reference numerals indicate like or corresponding parts and features.

A multi-speed epicyclic power shift transmission 10 is depicted in FIG. 1. Transmission 10 includes an input shaft 12, a first power transmission module 14, a second power transmission module 16, a third power transmission module 18 and an output shaft 20. A reverse gearset 22 is also provided and at least partially supported on a countershaft 24. A shift mechanism 26 is provided to allow a user to selectively place transmission 10 in one of a forward drive, a reverse drive or a neutral mode. In the forward drive mode, power is transferred from the vehicle engine to rotate output shaft 20 in a first direction. In the neutral mode, power is not transferred to output shaft 20. In the reverse drive mode, output shaft 20 rotates in an opposite direction from the forward drive mode rotational direction. Transmission 10 is arranged to provide seven forward speeds and one reverse speed. As will be described in greater detail, many similar automatic transmission may be constructed implementing the inventive concepts of the present disclosure. As such, it is contemplated that seven, eight, nine, ten, eleven and twelve speed power shift transmissions having a single input shaft are within the scope of the present disclosure.

First power transmission module 14 is arranged as an overdrive module selectively providing one of an overdrive ratio of 0.75:1 when in the active mode or a direct drive ratio of 1:1 when operating in an inactive mode. Second power transmission module 16 is arranged as a gear reduction unit providing a reduction ratio of 2.86:1 when in an active mode or a direct drive ratio of 1:1 when in an inactive mode. Third power transmission module 18 is arranged as a gear reduction unit providing a reduction ratio of 1.61:1 when in an active mode or a direct drive ratio of 1:1 when in an inactive mode. By selectively operating each of first, second and third power transmission modules 14, 16, 18 in one of the active or inactive modes previously mentioned, seven forward speeds having relatively small drive ratio steps therebetween may be provided. It should be appreciated that the particular gear ratio provided by any one power transmission module may be other than the examples provided without departing from the scope of the present disclosure. In particular, other individual power transmission module gear ratios may be combined to provide a different overall final drive ratio range more suitable for another application. The ease of creating different planetary gearsets leads to assembling various power transmission modules having different gear ratios without great expense.

Figures 2, 5:
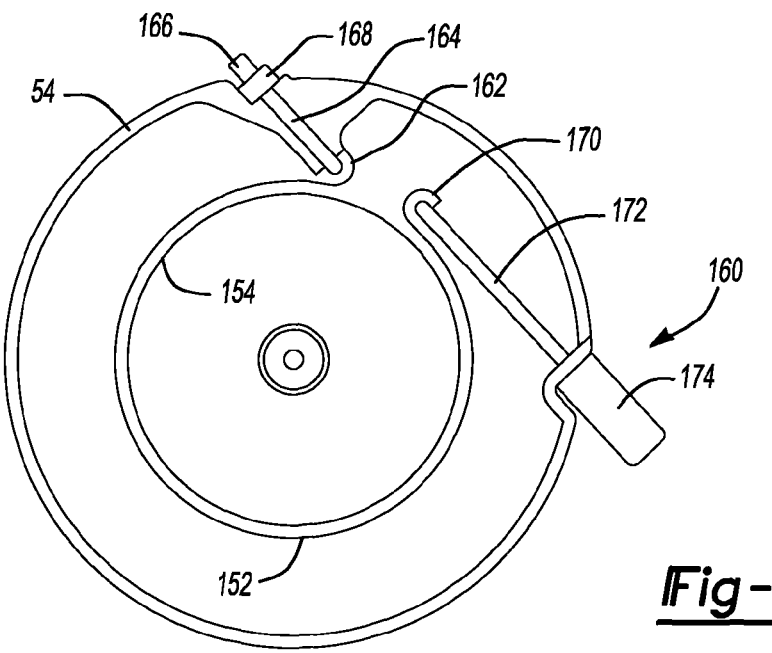
FIG. 2 is a gear ratio, ratio step and shift chart relating to the seven speed transmission depicted in FIG. 1.
FIG. 5 is a cross-sectional view showing a band brake actuation mechanism.

FIG. 2 depicts a shift chart providing exemplary final drive ratios that may be obtained by selectively activating one of first, second and third power transmission modules 14, 16, 18. As previously implied, a power transmission module will be considered active when a ratio other than the direct drive ratio of 1:1 is being transferred. Accordingly, a first gear final drive ratio of 4.51:1 is provided when second power transmission module 16 and third power transmission module 18 are in the active mode while first power transmission module 14 is in the inactive mode. Operation of transmission 10 provides various other final drive ratios as will be described hereinafter.

FIG. 1 shows an optional wet clutch 30 selectively drivingly interconnecting first input shaft 12 with an auxiliary shaft 32. Clutch 30 includes a hub 34 fixed for rotation with auxiliary shaft 32. A drum 36 is fixed for rotation with input shaft 12. A plurality of interleaved friction plates 38 may be selectively forced into contact with one another to transfer torque between hub 34 and drum 36. It is contemplated that at least some torque is transferred through clutch 30 at all times of operation of transmission 10. Through the use of clutch 30 in this manner, transmission 10 may be directly coupled to an engine (not shown) thereby alleviating the need for a torque converter.

First power transmission module 14 includes a planetary gearset 40 having a sun gear 42 rotatably supported on input shaft 12, a ring gear 44 and a plurality of pinion gears 46 meshingly engaged with ring gear 44 and sun gear 42. A carrier 48 rotatably supports pinion gears 46. One portion of carrier 48 is fixed to or integrally formed with input shaft 12. A drum 50 is fixed for rotation with sun gear 42. An actuation clutch 52 selectively drivingly couples drum 50 to a housing 54 to restrict rotation of drum 50. Power transmission module 14 may be placed in the active mode by actuating clutch 52 to act as a brake restricting sun gear 42 from rotation. Power flows through first transmission module 14 input at carrier 48 and output at ring gear 44. A drive plate 56 drivingly interconnects ring gear 44 and second power transmission module 16. Accordingly, when clutch 52 is transferring torque, first power transmission module 14 transfers power at an overdrive ratio.

In the inactive mode of operating first power transmission module 14, clutch 52 is released and does not transfer torque. Sun gear 42 is allowed to rotate relative to housing 54. A one-way clutch 58 interconnects carrier 48 and ring gear 44. One-way clutch 58 allows relative rotation of carrier 48 relative to ring gear 44 in a first direction but restricts relative rotation between the two components in an opposite direction. Accordingly, when a direct drive ratio of 1:1 is desired, one-way clutch 58 assures that ring gear 44 and carrier 48 rotate at the same speed in the same direction such that the torque magnitude input to carrier 48 equals the torque magnitude output by ring gear 44.

Depending on the direction of torque transfer, power transmission modules 14, 16 and 18 operate in one of a drive mode and a coast mode. In the drive mode, torque is being provided from the vehicle engine and transferred across the power transmission module toward output shaft 20. In the coast mode, torque is being provided by a vehicle driveline (now shown) to output shaft 20 and transferred toward the vehicle engine. It has been discovered that many vehicle operators desire some magnitude of engine braking when the engine throttle is released. Engine braking may occur during coast mode operation. With reference to first power transmission module 14, one-way clutch 58 is overrunning during the drive mode of operation. In the coast mode of operation, one-way clutch 58 reacts torque and causes carrier 48 to rotate at the same speed as ring gear 44.

Figure 3:
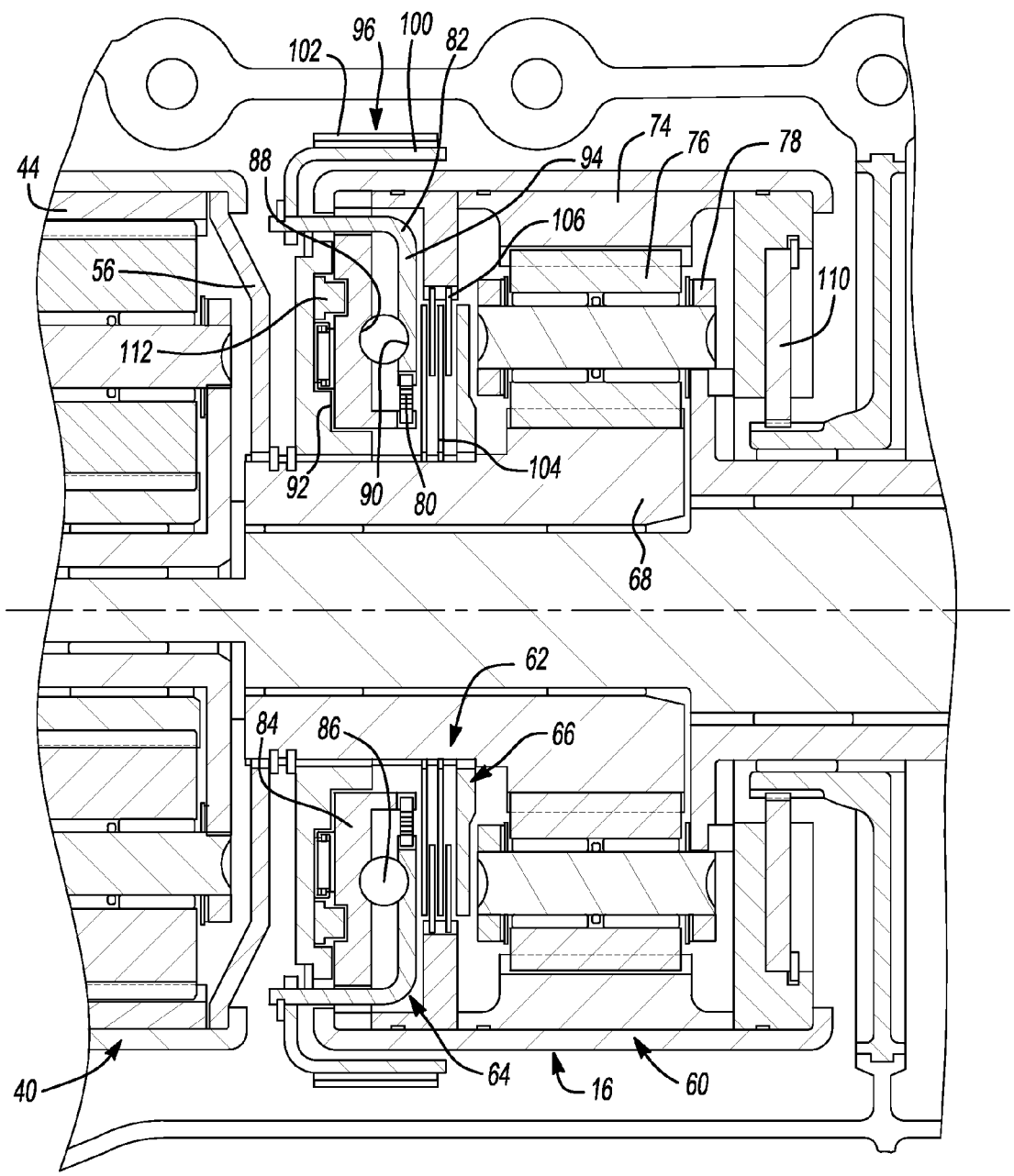
FIG. 3 is an enlarged fragmentary cross-sectional view of a power transmission module shown in FIG. 1.

FIG. 3 depicts an enlarged view of second power transmission module 16 including a planetary gearset 60 and an actuation mechanism 62. Actuation mechanism 62 includes a ball ramp actuator 64 and a friction plate clutch 66. Actuation mechanism 62 is selectively operable to place second power transmission module in one of the active and inactive modes. A direct drive ratio of 1:1 may be achieved by causing sun gear 68 and ring gear 74 to rotate at the same speed. Actuation mechanism 62 is configured to provide the direct drive 1:1 ratio when in the inactive mode.

Planetary gearset 60 includes a sun gear 68 supported for rotation on a center shaft 70. Center shaft 70 is rotatably supported by input shaft 12 and a stub shaft 72. Planetary gearset 60 also includes a ring gear 74 and a plurality of pinion gears 76 in meshed driving engagement with sun gear 68 and ring gear 74. A carrier 78 rotatably supports pinion gears 76. Carrier 78 is supported for rotation on center shaft 70 and is arranged as the output of second power transmission module 16 being continuously drivingly coupled to third power transmission module 18. As previously mentioned, the input to second power transmission module 16 is provided by drive plate 56 driving sun gear 68

Ball ramp actuator 64 includes a torsional spring 80 applying a torque to a rotary plate 82. Ball ramp actuator 64 also includes a reaction plate 84 and a plurality of balls 86 positioned between rotary plate 82 and reaction plate 84. At least one of rotary plate 82 and reaction plate 84 includes tapered grooves 88, 90 in receipt of balls 86. Relative rotation between rotary plate 82 and reaction plate 84 causes a change in the spacing between an outer surface 92 of reaction plate 84 and an outer surface 94 of rotary plate 82.

A brake 96 includes a brake drum 100 fixed for rotation with rotary plate 82 and a band 102 selectively engageable with brake drum 100 to restrict rotary plate 82 from rotation.

When second power transmission module 16 is in the inactive mode, band 102 is not engaged brake drum 100. Accordingly, torsional spring 80 causes rotary plate 82 to rotate relative to reaction plate 84 and space apart outer surface 92 and outer surface 94 relative to one another. Because reaction plate 84 is axially fixed, rotary plate 82 axially translates to actuate clutch 66. Clutch 66 includes a plurality of inner plates 104 fixed for rotation but axially moveable relative to sun gear 68 as well as a plurality of outer clutch plates 106 fixed for rotation with ring gear 74. When ball ramp actuator 64 is actuated by torsion spring 80, clutch 66 acts to fix sun gear 68 for rotation with ring gear 74 and provide a direct drive 1:1 ratio through second power transmission module 16. When band 102 is disengaged from brake drum 100 and second power transmission module 16 is operating in an inactive direct drive mode, one-way clutches 110 and 112 are overrunning.

Band 102 is placed in frictional engagement with brake drum 100 when a gear reduction ratio is desired from second power transmission module 16. Second power transmission module 16 is now in the active drive mode. By restricting brake drum 100 from rotation relative to housing 54, rotary plate 82 is also restricted from rotating relative to reaction plate 84. At this time, the axial spacing between outer surface 92 and outer surface 94 is minimized such that a force is not imparted to clutch 66. Ring gear 74 may rotate relative to sun gear 68. One-way clutch 110 reacts torque provided from ring gear 74. One-way clutch 112 is overrunning. Therefore, a drive reduction exists between sun gear 68 and carrier 78. Up until this point, operation of second power transmission module 16 has been discussed in view of transferring torque from sun gear 68 to carrier 78 in the drive mode. As previously mentioned, it may be desirable to transfer torque in the coast mode of operation where output shaft 20 functions as the input and input shaft 12 functions as the output. In particular, it may be desirable to provide some level of engine braking via the driveline and transmission 10. Specifically, when second power transmission module 16 operates in the inactive coast mode, one-way clutch 112 prevents ring gear 74 from overrunning sun gear 68. At the same time one-way clutch 110 is overrunning.

When second power transmission module 16 operates in the active coast mode of operation, carrier 78 acts as an input while sun gear 68 acts as an output. One-way clutch 112 is in an overrunning condition while one-way clutch 110 reacts torque from ring gear 74.

Figure 4:
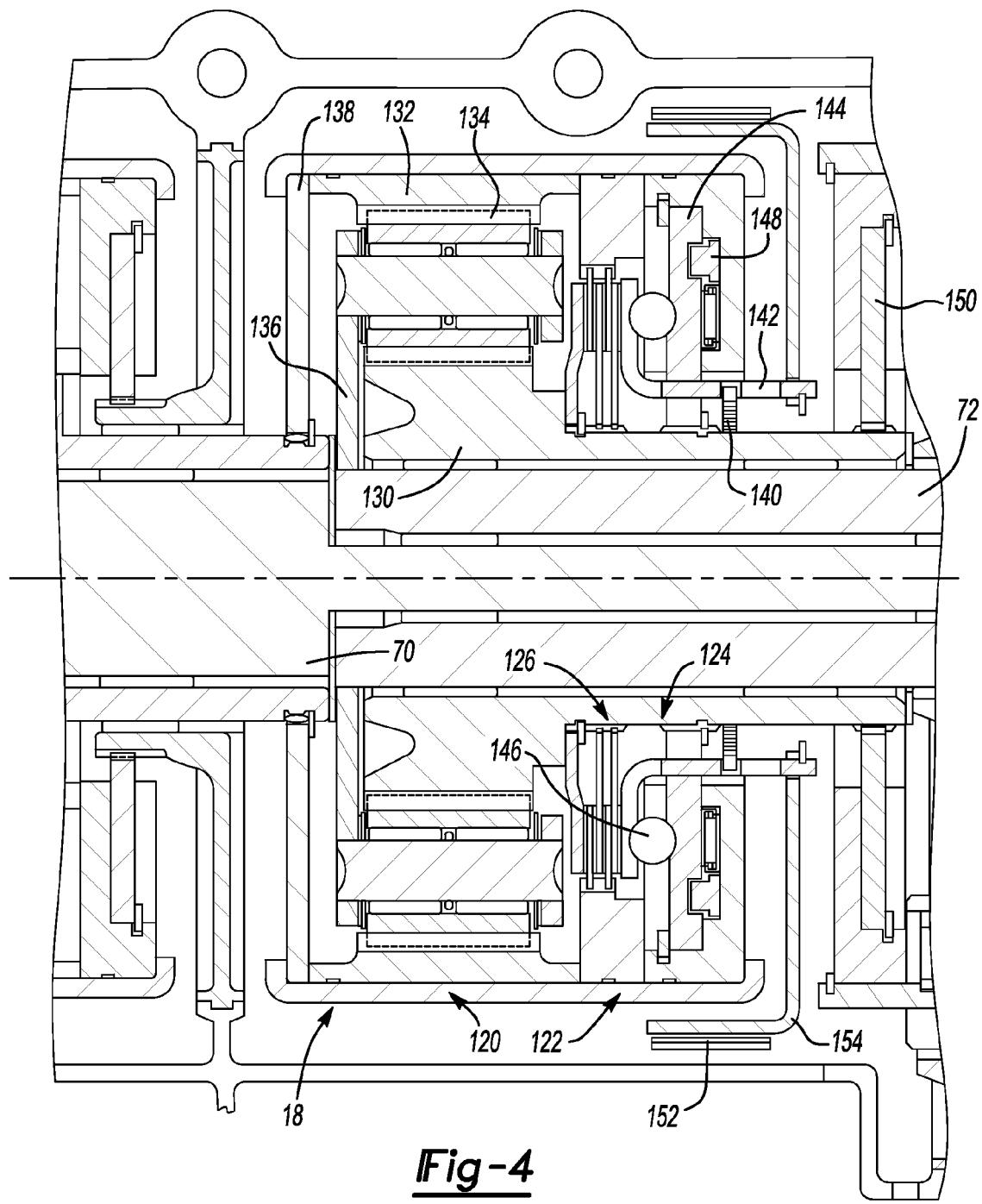
FIG. 4 is an enlarged fragmentary cross-sectional view of another power transmission module shown in FIG. 1.

Third power transmission module 18 is depicted in FIGS. 1 and 4 and includes a planetary gearset 120 and an actuator 122. Actuator 122 includes a ball ramp actuator 124 and a friction plate clutch 126. Planetary gearset 120 includes a sun gear 130 supported for rotation on stub shaft 72, a ring gear 132 and a plurality of pinion gears 134 in driving meshed engagement with sun gear 130 and ring gear 132. A carrier 136 supports pinion gears 134 for rotation. Third power transmission module 18 is configured such that ring gear 132 is the input and carrier 136 provides the output when operating in the drive mode.

Third power transmission module 18 is configured substantially similarly to second power transmission module 16 in that actuator 122 causes third power transmission module 18 to provide a direct drive 1:1 ratio when in the inactive mode and provides a reduced gear output when in the active mode. The direct drive 1:1 ratio is provided by restricting ring gear 132 from rotating relative to sun gear 130. A drive plate 138 drivingly interconnects carrier 78 of second power transmission module 16 with ring gear 132 of third power transmission module 18. A rotary spring 140 rotates a rotary plate 142 relative to a reaction plate 144 of ball ramp actuator 124. Relative rotation between the plates causes a plurality of balls 146 to run up ramps and axially separate rotary plate 142 from reaction plate 144. An axial force acts on friction clutch 126 to fix sun gear 130 and ring gear 132 to one another. A one-way clutch 148 and a one-way clutch 150 are overrunning when third power transmission module 18 is in the inactive drive mode providing a direct 1:1 ratio. When in the inactive coast mode, carrier 136 becomes the input and ring gear 132 becomes the output of third power transmission module 18. At this time, one-way clutch 148 prevents sun gear 130 from overrunning ring gear 132. One-way clutch 150 is overrunning during this mode of operation.

To operate third power transmission module 18 in the active or gear reduction mode, a band 152 is engaged with a brake drum 154. Brake drum 154 is fixed to rotary plate 142. Accordingly, engagement of band 152 with brake drum 154 restricts rotation of rotary plate 142 relative to reaction plate 144. Friction clutch 126 does not transfer torque and sun gear 130 may rotate relative to ring gear 132. In the active drive mode of operation, one-way clutch 148 is in an overrunning mode while one-way clutch 150 reacts torque to restrict sun gear 130 from rotating. When third power transmission module 18 operates in the active coast mode, one-way clutch 150 continues to transfer torque and one-way clutch 148 continues to be in an overrunning mode of operation. Band 152 remains engaged with brake drum 154 to hold the ball ramp actuator 124 off such that torque is not transferred through clutch 126.

FIG. 5 shows an exemplary band actuation mechanism 160 operable to selectively engage band 152 with drum 154. A first end 162 of band 152 is coupled to housing 54 by an adjustment mechanism 164. Adjustment mechanism 164 includes a threaded rod 166 and a nut 168. Threaded rod 166 may be translated to move first end 162 to a desired location. Once first end 162 is at the desired position, nut 168 may be tightened to fix the axial location of threaded rod 166 and first end 162. A second end 170 of band 152 is fixed to an arm 172 selectively moveable by an electromechanical device 174. Electromechanical device 174 is operable to move arm 172 between at least two positions corresponding to the band engaged and band disengaged from the brake drum positions. Accordingly, electromechanical device 174 may be constructed as a simple solenoid or may include an electric motor operable to move arm 172 to a variety of desired positions. It is contemplated that electromechanical device 174 be relatively small because the torque transfer between band 152 and brake drum 154 is relatively low having a magnitude less than 100 lb-ft. Alternatively, arm 172 may be selectively moved between two positions by a simple hydraulic device in lieu of electromechanical device 174. Furthermore, band 102 may be selectively engaged or disengaged with brake drum 100 via a band actuation mechanism substantially similar to band actuation mechanism 160.

Referring once again to FIG. 1, shift mechanism 26 of transmission 10 includes a shift fork 180 supported on a shift rail 182. Shift rail 182 is axially moveable relative to and supported by housing 54. Shift fork 180 is fixed to shift rail 182 and translates therewith. A shift collar 184 is in splined engagement with a hub 186 fixed for rotation with stub shaft 72. Shift collar 184 is axially moveable relative to hub 186 between one of three positions, namely, a reverse position, a neutral position and a forward position. In the neutral position, shift collar 184 is clear of adjacent elements and torque is not transferred through collar 184. When collar 184 is moved to the reverse position by axial translation of shift rail 182 and shift fork 180, shift collar 184 engages a first drive sprocket 188 of reverse gearset 22. Reverse gearset 22 also includes a driven sprocket 192 drivingly coupled to drive sprocket 188 via a chain 194. Driven sprocket 192 is fixed for rotation with countershaft 24. A reverse drive gear 196 is also fixed for rotation with countershaft 24. Reverse drive gear 196 is in meshed engagement with a reverse driven gear 198 fixed for rotation with output shaft 20.

To transmit torque through transmission 10 and provide a forward drive gear ratio, shift rail 182 and shift fork 180 are axially translated to cause shift collar 184 to drivingly engage reverse driven gear 198. Torque transfers from stub shaft 72 through hub 186, collar 184, reverse driven gear 198 and output shaft 20.

A parking pawl 200 is selectively engageable with a parking gear 202 splined to output shaft 20. Parking pawl 200 is moveable between a retracted position shown in FIG. 1 and an advanced position where parking pawl 200 engages parking gear 202 to restrict output shaft 20 from rotation. With reference to FIG. 2, a first forward transmission drive ratio of 4.5:1 may be achieved by placing second power transmission module 16 and third power transmission module 18 in the active modes while leaving first power transmission module in the inactive mode. A first gear to second gear shift may be achieved by switching third power transmission module 18 to the inactive mode by releasing band 152 from brake drum 154. A second to third gear up shift is achieved by activating first power transmission module 14 and leaving second power transmission module 16 active as well. A third to fourth gear shift entails inactivating first power transmission module 14 and second power transmission module 16 and activating third power transmission module 18. To complete a fourth to fifth forward gear up shift, third power transmission module 18 remains active and first power transmission module 14 is also activated. Sixth gear is a direct drive ratio of 1:1. Accordingly, each of first, second and third power transmission modules 14, 16, 18 are inactive. Seventh gear is an overdrive gear and may be provided by activating only first power transmission module 14.

Figure 6:
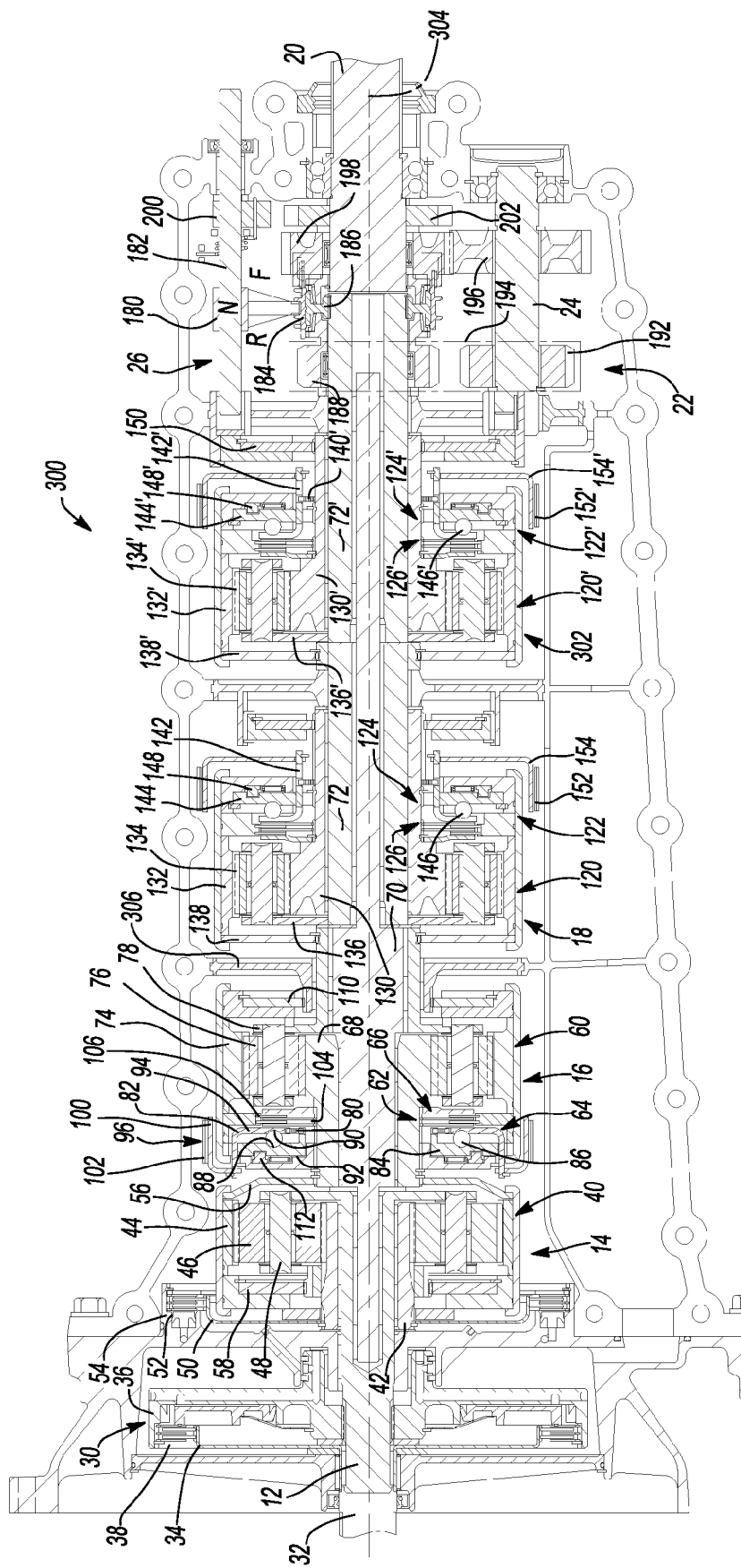
FIG. 6 is a cross-sectional view of a ten speed automatic transmission.

FIG. 6 depicts a 10-speed automatic transmission 300 substantially similar to transmission 10. FIG. 4 illustrates the module concept well including previously described input shaft 12, first power transmission module 14, second power transmission module 16, third power transmission module 18, output shaft 20, reverse gearset 22, countershaft 24, shift mechanism 26 and wet clutch 30 from transmission 10. An additional three forward gear ratios may be obtained by positioning a fourth power transmission module 302 downstream from third power transmission module 18. Fourth power transmission module 302 is substantially similar to third power transmission module 18 except that the size of certain components within the planetary gearset have been changed to provide a gear reduction ratio of 1.5:1 compared to the gear reduction ratio of 1.61:1 provided by third power transmission module 18. Accordingly, the elements of fourth power transmission module 302 will be identified with the reference numerals of third power transmission module 18 including a prime suffix.

Figures 7, 8:
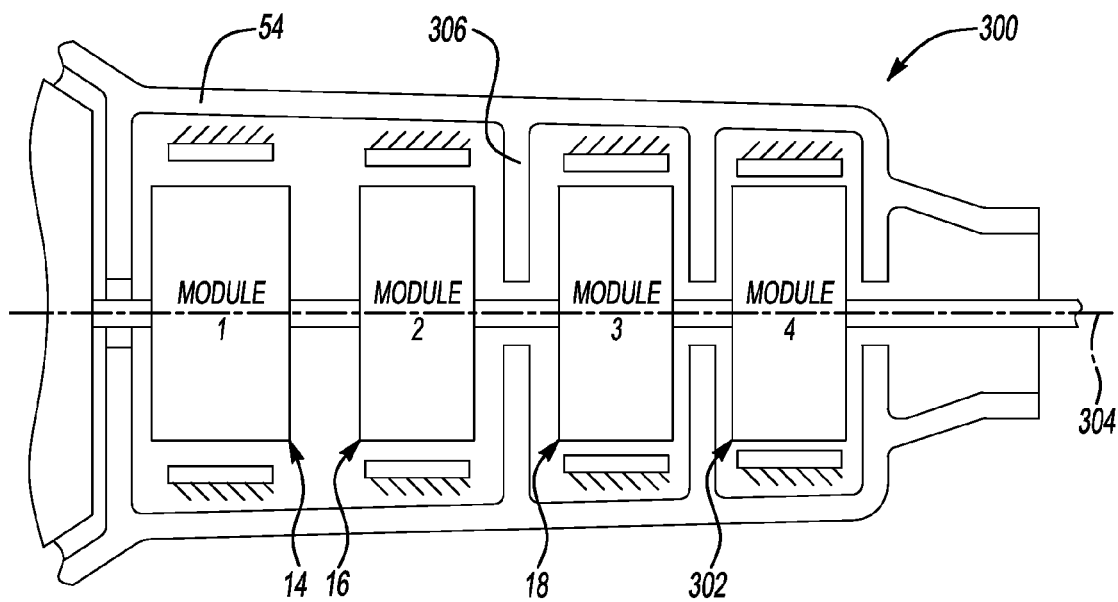
FIG. 7 is a gear ratio, ratio step and shift chart relating to the ten speed transmission depicted in FIG. 6.
FIG. 8 is a cross-sectional view depicting a two-piece transmission housing.

FIG. 7 is an element chart indicating which of the first through fourth power transmission modules 14, 16, 18, 302 are placed in an active mode to obtain the desired final drive ratio. Through the use of the proposed module ratios, a first gear ratio of 6.38:1 is provided. Because of the magnitude of this ratio, a torque converter may be eliminated. In addition, a final drive gear reduction unit may be configured with a reduced reduction ratio, such as 3.90 to 3.00:1. Furthermore, due to the modular nature of transmissions 10 and 300, the overall size and weight of these transmissions is greatly reduced. The cost of manufacturing transmissions 10 and 300 may also be reduced due to the elimination of a need for hydraulic fluid passageways acting on elements of the power transmission modules.

FIG. 8 depicts yet another feature of power transmissions 10 and 300 in that housing 54 may be split along a centerline 304 about which input shaft 12 and output shaft 20 rotate. Accordingly, two case halves, one of which is shown in FIGS. 1 and 4 are defined. A plurality of webs 306 may be integrally formed with housing 54 or subsequently positioned therein. Webs 306 define pockets or cavities in receipt of the various power transmission modules. During assembly of any one of the transmissions envisioned by the present disclosure, the power transmission modules along with their associated shafts may be assembled and subsequently dropped into one of the transmission housing halves 54. Assembly is completed by fixing the opposite transmission housing half to the prior half.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A multi-speed transmission comprising:
    an input shaft;
    an output shaft;
    a first power transmission module driven by said input shaft;
    a second power transmission module driven by said first power transmission module; and
    a third power transmission module driven by said second power transmission module and driving said output shaft, each power transmission module including an actuation mechanism and a planetary gearset, each actuation mechanism being operable to control the output of its respective planetary gearset to one of a first gear ratio and a second gear ratio, wherein one of said actuation mechanisms includes a rotary plate, a clutch and a spring, the spring biasing the rotary plate to rotate and cause a corresponding actuation of said clutch, said clutch causing two members of said respective planetary gearset to rotate at substantially the same speed and provide said first gear ratio, said actuation mechanism further being operable to selectively restrict said rotary plate from rotating and prevent actuation of said clutch to provide said second gear ratio.

2. The multi-speed transmission of claim 1 wherein the first gear ratio is 1:1.

3. The multi-speed transmission of claim 2 wherein said second gear ratio is greater than 1:1.

4. The multi-speed transmission of claim 1 wherein said actuation mechanism includes a band brake to restrict said rotary plate from rotating.

5. The multi-speed transmission of claim 1 wherein said actuation mechanism includes a plurality of balls positioned between said rotary plate and a reaction plate, said rotary plate and said reaction plate axially moving relative to one another in response to rotation of said rotary plate.

6. The multi-speed transmission of claim 1 wherein another one of said actuation mechanisms includes a hydraulically actuated plate clutch.

7. The multi-speed transmission of claim 1 wherein said spring and said clutch are positioned within a cylindrical space defined by an outer diameter of a ring gear of said respective planetary gearset.

8. The multi-speed transmission of claim 1 wherein each power transmission module includes a one-way clutch restricting relative rotation between two planetary gearset members in a first direction and allowing relative rotation between said two planetary gearset members in a second direction opposite said first direction.

9. The multi-speed transmission of claim 8 wherein one of the power transmission modules includes another one-way clutch restricting rotation of one planetary gearset member in a first direction and allowing rotation in an opposite direction.

10. The multi-speed transmission of claim 1 wherein said first power transmission module provides an overdrive ratio and a direct drive ratio.

11. The multi-speed transmission of claim 10 wherein said second power transmission module provides a reduction ratio and a direct drive ratio.

12. The multi-speed transmission of claim 11 wherein said third power transmission module provides a reduction ratio and a direct drive ratio.

13. The multi-speed transmission of claim 12 wherein said first power transmission module overdrive ratio is substantially 0.75:1, said second power transmission module reduction ratio is 2.9:1 and said third power transmission module reduction ratio is 1.6:1.

14. The multi-speed transmission of claim 13 wherein said transmission provides seven forward gear ratios ranging from substantially 4.5:1 to 0.75:1.

15. The multi-speed transmission of claim 1 further including a fourth power transmission module driven by said second power transmission module and driving said third power transmission module.

16. A multi-speed transmission comprising:
an input shaft;
an output shaft;
a first power transmission module driven by said input shaft;
a second power transmission module driven by said first power transmission module and driving said output shaft, each power transmission module including an actuation mechanism and a planetary gearset, each actuation mechanism being operable to control the output of its respective planetary gearset to one of a first gear ratio and a different second gear ratio, wherein one of said actuation mechanisms includes a ball ramp mechanism having a spring urging a rotatable member to rotate and cause a reaction member to translate to actuate a clutch without external input, said clutch causing two members of said respective planetary gearset to rotate at substantially the same speed to provide said first gear ratio, said one actuation mechanism further being operable to restrict at least one of rotation of said rotatable member and translation of said reaction member to prevent actuation of said clutch to provide said second gear ratio.

17. The multi-speed transmission of claim 16 wherein one of said actuation mechanisms includes a band brake to restrict said rotatable member from rotating.

18. The multi-speed transmission of claim 16 wherein each power transmission module includes a one-way clutch restricting relative rotation between two planetary gearset members in a first direction and allowing relative rotation between said two planetary gearset members in a second direction opposite said first direction to provide said second gear ratio.

19. The multi-speed transmission of claim 16 wherein said first power transmission module provides an overdrive ratio and a direct drive ratio.

20. The multi-speed transmission of claim 16 wherein one of said actuation mechanisms includes an electric motor to restrict said ball ramp mechanism.

21. A multi-speed transmission comprising:
an input shaft;
an output shaft;
a first planetary gearset outputting one of a gear ratio equal to 1 or a gear ratio less than 1 and being driven by said input shaft;
a second planetary gearset outputting one of a gear ratio equal to 1 or a gear ratio greater than 1 and being driven by said first planetary gearset;
a third planetary gearset outputting one of a gear ratio equal to 1 or a gear ratio greater than one, being driven by said second planetary gearset and driving said output shaft;
a biasing mechanism including a spring urging a rotatable member to rotate and cause a reaction member to translate to actuate a clutch causing said second planetary gearset to output said gear ratio equal to 1; and
a brake counteracting said biasing mechanism to cause said second planetary gearset to output said gear ratio greater than 1.

22. The multi-speed transmission of claim 21 wherein said reaction plate acts on a plate clutch to fix two members of said second planetary gearset for rotation with one another.

23. The multi-speed transmission of claim 22 further including an electric actuator operating said brake.

24. The multi-speed transmission of claim 21 further including another biasing mechanism causing said third planetary gearset to output said gear ratio equal to 1 and another brake counteracting said another biasing mechanism to cause said third planetary gearset to output said gear ratio greater than 1.

* * * * *